United States Patent
Küpper et al.

(10) Patent No.: US 6,884,374 B2
(45) Date of Patent: Apr. 26, 2005

(54) SUCTION CONTROL IN A SUCTION/ BLOWING MOLD SYSTEM

(75) Inventors: Rudolf Küpper, Neunkirchen-Seelscheid (DE); Heinz-Hugo Willach, Lohmar (DE); Hubert Müller, Ruppichteroth (DE)

(73) Assignee: Fischer-W. Muller Blasformtechnik GmbH, Troisdorf (DE)

( * ) Notice: Subject to any disclaimer, the term of this patent is extended or adjusted under 35 U.S.C. 154(b) by 742 days.

(21) Appl. No.: 09/736,042

(22) Filed: Dec. 13, 2000

(65) Prior Publication Data

US 2001/0011781 A1 Aug. 9, 2001

(30) Foreign Application Priority Data

Dec. 16, 1999 (DE) .......................................... 199 60 592

(51) Int. Cl.[7] .............................................. B29C 49/04
(52) U.S. Cl. ...................... 264/40.3; 264/506; 264/508; 264/536; 264/540; 264/571; 425/532; 425/534
(58) Field of Search ................................ 264/508, 40.3, 264/536, 540, 571, 506; 425/532, 534

(56) References Cited

U.S. PATENT DOCUMENTS

| | | | | |
|---|---|---|---|---|
| 4,865,799 A | * | 9/1989 | Sadr | 264/526 |
| 5,460,771 A | * | 10/1995 | Mitchell et al. | 264/508 |
| 6,089,851 A | * | 7/2000 | Lupke et al. | 425/233 |
| 6,655,951 B1 | * | 12/2003 | Kupper | 425/532 |

FOREIGN PATENT DOCUMENTS

| | | |
|---|---|---|
| JP | 63165118 | 7/1988 |
| JP | 04296524 | 10/1992 |

* cited by examiner

Primary Examiner—Suzanne E. McDowell
(74) Attorney, Agent, or Firm—Herbert Dubno; Andrew Wilford

(57) ABSTRACT

A plastic hollow preform is drawn through a mold passage formed in a closed mold by applying a generally constant suction to a downstream end of a conduit having an upstream end connected to an output end of the mold passage. A flow cross section of the conduit is varied between its upstream and downstream ends so as to vary a rate at which the preform is drawn through the passage by the suction. The flow cross section is varied by displacing a valve element in the conduit between positions in which it differently blocks flow through the conduit.

9 Claims, 2 Drawing Sheets

SUCTION CONTROL IN A SUCTION/BLOWING MOLD SYSTEM

FIELD OF THE INVENTION

The present invention relates to a suction/blowing mold system. More particularly this invention concerns controlling the suction in such a system.

BACKGROUND OF THE INVENTION

In a standard suction/blowing mold system for producing complex three-dimensional hollow articles, typically of plastic, a hollow preform having a closed leading end is produced by an extruding apparatus. This leading end is engaged in an upper intake end of a die cavity that is formed as a passage between two fitted-together female die halves and that is of somewhat greater cross-sectional size than the preform. Suction is applied to the opposite lower or output end of the die passage to draw the preform down through the mold as it is either emitted by the extruding apparatus or advanced by a manipulator.

Once the preform is threaded completely through the mold cavity, its leading and trailing ends are pinched closed at the upper and lower passage ends. A needle is then inserted centrally into the preform and gas is blown into it to expand it to fill the mold cavity. Once the material of the preform has cured, the mold is opened and the finished workpiece is removed. It will have the exact shape of the mold passage with no flashing or sprues. In particular its inner surface will be perfectly smooth and without seams. Such a system as described in "Technische Mitteilungen Krupp" (February 1998/pages 49/50) is used, for instance, to make complexly shaped manifold or feed tubes for appliances.

In drawing the soft preform through the mold passage, which is typically nonstraight as it is just this type of application that is particularly suited for suction/blow molding, it is necessary in the interest of speedy production to apply enough suction to move the preform as rapidly as possible while not at the same time applying so much suction that the preform is torn or damaged. As the leading end of the preform moves along straight portions of the mold cavity the suction can be great for a rapid travel speed, but when corners are being rounded a smaller pressure differential is needed to slow down travel and prevent damage to the preform.

In the 2 sec the entire operation takes it is not possible to significantly vary the throughput rates of the large-capacity blowers or pumps used to produce the necessary suction. Thus the known system must be set to use at many times lower suction that what could actually be used.

OBJECTS OF THE INVENTION

It is therefore a object of the present invention to provide an improved suction control for a suction/blowing mold system.

Another object is the provision of such an improved suction control for a suction/blowing mold system which overcomes the above-given disadvantages, that is which allows fine and rapidly variable control over the suction applied to the preform as it is sucked through the mold.

SUMMARY OF THE INVENTION

A plastic hollow preform is drawn through a mold passage formed in a closed mold by applying a generally constant suction to a downstream end of a conduit having an upstream end connected to an output end of the mold passage. A flow cross section of the conduit is varied between its upstream and downstream ends so as to vary a rate at which the preform is drawn through the passage by the suction. The flow cross section is varied by displacing a valve element in the conduit between positions in which it differently blocks flow through the conduit.

In this manner it is possible to achieve a high level of control over the instantaneous level of suction that is applied to the outlet end of the passage. Even using a large compressor that itself cannot be speeded up or slowed down, it is possible to rapidly vary the pressure at the passage outlet end with great accuracy. Thus this pressure can be tailored to achieve the maximum possible feed speed in the straight stretches of the mold passage and slower speeds as the parison rounds corners of the passage.

According to the invention outside air is admitted to the conduit downstream of the valve element when pressure in the conduit downstream of the element drops below a predetermined level. Thus the compressor will not be forced to overwork and thus overheat.

Furthermore in accordance with the invention the hollow preform is displaced toward the mold and into the passage at a predetermined rate, and then trailing and leading ends of the preform are pinched off when same are respectively at the output end and an intake end of the passage. The preform is inflated after pinching-off its ends and cure. The mold is opened after curing the preform, the cured preform is removed from the open mold, and the mold is reclosed.

The molding apparatus has according to the invention has a closable mold forming when closed a nonstraight passage having an intake end and an output end, an extruder system for forming a hollow plastic preform and feeding it to the intake end of the passage, and a suction conduit having an upstream end connected to the output end of the passage and a downstream end. A compressor or pump connected to the downstream end of the conduit applies a generally constant suction thereto. A valve element in the conduit intermediate its ends is movable for varying a flow cross section of the conduit. A controller connected to the conduit and to the extruder moves the valve element and varies suction applied through the conduit to the passage in accordance with a position of the preform relative to the mold.

The valve element according to the invention is pivotal in the conduit. In addition a bypass is provided for introducing air into the conduit downstream of the element when pressure downstream of the element drops below a predetermined level. The pump has an output provided with a sound muffler.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
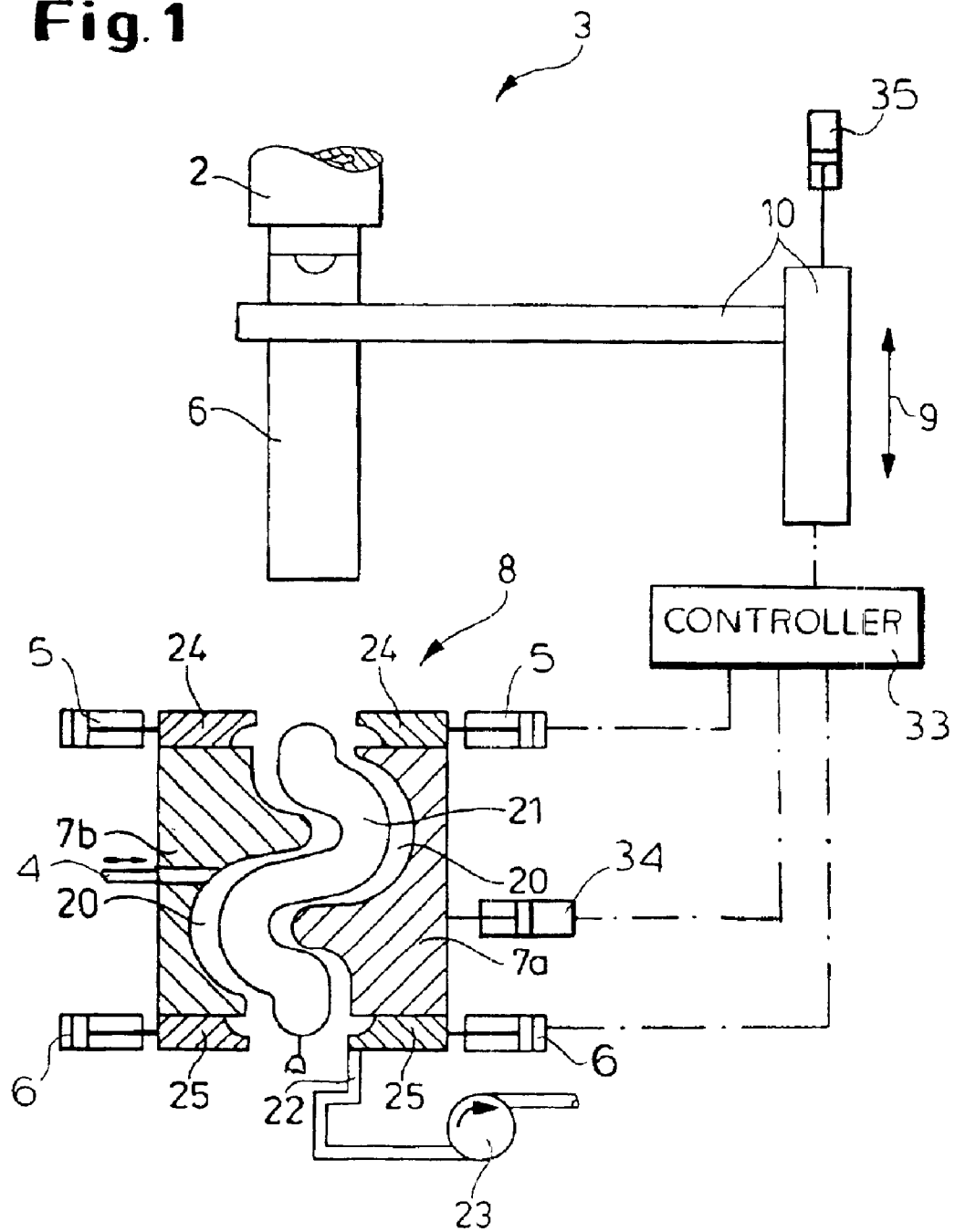
FIG. 1 is a largely schematic view illustrating a suction/blowing apparatus at the end of a molding cycle.

As seen in FIG. 1 a extruder system 3 has a head 2 that produces a preform 6 engaged by a handler or manipulator 10 movable by an actuator 35 in a direction 9 toward and away from a mold 8 having a pair of female mold halves 7a and 7b forming a nonstraight passage 20 having an upper intake end and a lower output end. At the start of a mold cycle the two mold halves 7a and 7b are closed together by hydraulic actuators 34 and suction is applied by a suction conduit 22 to the bottom of the passage cavity 20 to suck the preform 6 down through it, as the preform 6 is being extruded from the nozzle 2 and/or advanced by the manipulator 10.

Once a leading end of the preform 6 is at a lower end of the cavity 20, upper and lower pinchers 24 and 25 are closed by respective actuators 5 and 6 to pinch off the trailing and leading ends of the preform 6. Then a needle 6 is poked into a central region of the preform 6 to inflate it to a finished workpiece 21 that is cured in the mold 8. Thereafter the mold 8 is opened, the pinchers 24 and 25 are released, and the finished workpiece 21 is removed from the open mold. A common computer-type controller 33 operates the actuators 5, 6 and 34 as well as the extruder system 3 and the actuator 35 of the manipulator 10.

Figure 3:
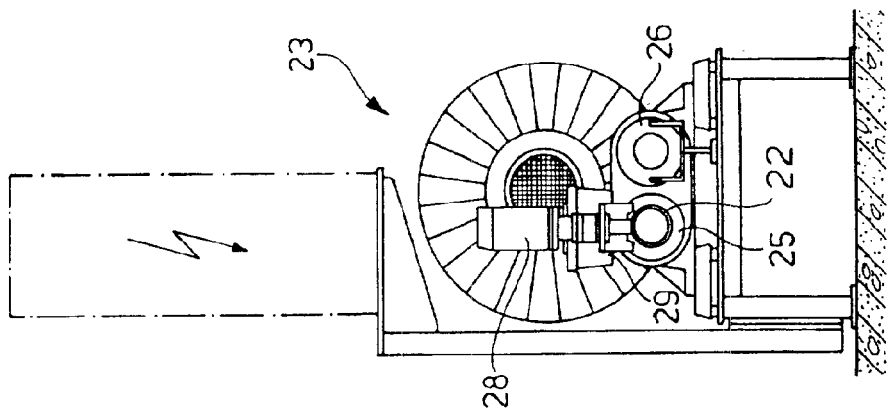
FIG. 3 is an end view in the direction of arrow III of FIG. 2.
Figure 2:
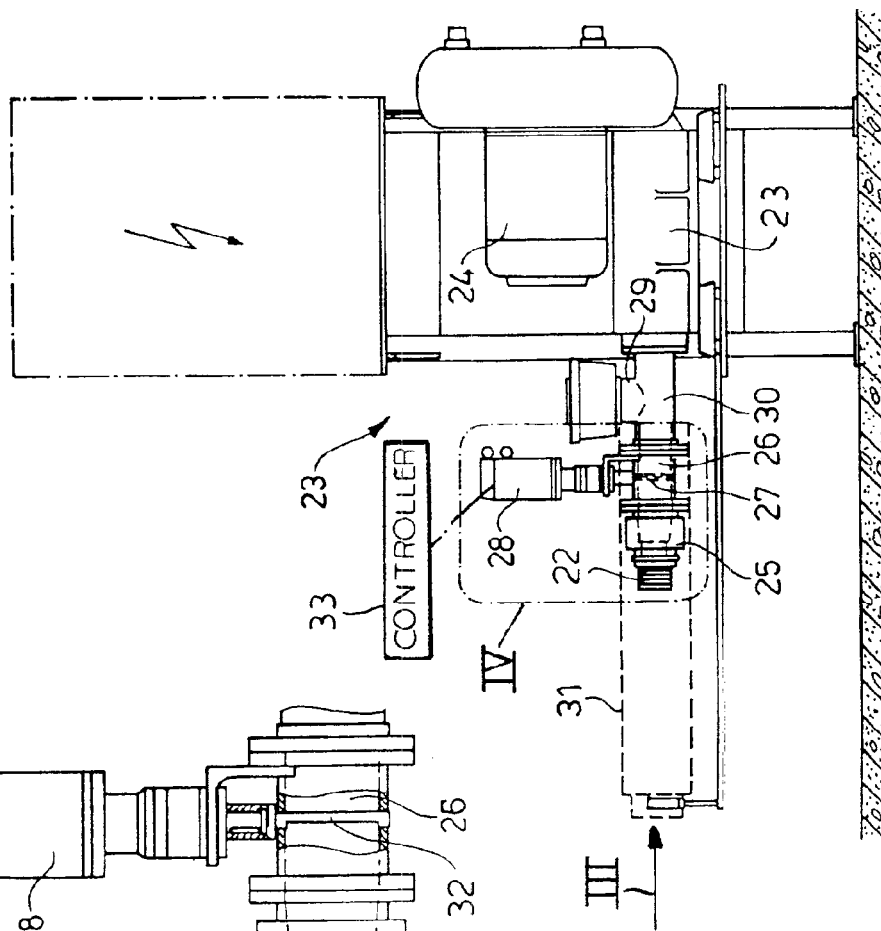
FIG. 2 is somewhat more detailed but small-scale view of the suction subassembly for the system of FIG. 1.
Figure 4:
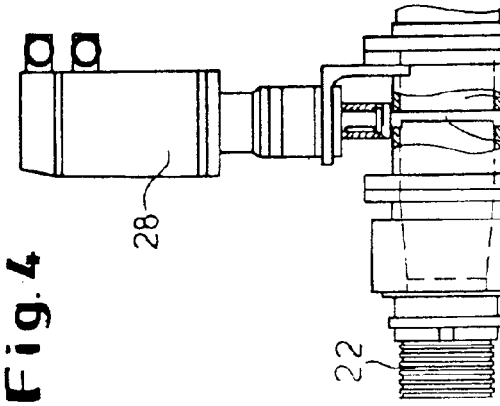
FIG. 4 is a larger-scale view of the detail indicated at IV in FIG. 2.

As shown in FIGS. 2, 3, and 4, the suction line 22 has a downstream end connected to an intake 25 of a side-type position-displacement compressor 23. The intake 25 is provided with a valve element or shutter 27. The compressor 23 has an output 26 fitted with a muffler 31. A large electric motor 24 drives the compressor 23 and a rotary actuator 28 can pivot the valve element 27 to partially or completely block the intake 25. A bypass 29 fitted with a pressure-sensitive valve 30 allows the compressor 23 to draw in air downstream of the element 27 even when the element 27 is blocking essentially the entire intake 25.

According to the invention the controller 33 operates the actuator 28 to displace the valve element 27 so as to block flow through the conduit 22 in accordance with the instantaneous position of the preform 6. When it is entering an upper straight portion of the cavity 20, the suction is maximized, but when it moves around corners in the cavity 20, the suction is lessened for slower travel.

We claim:

1. A molding method comprising the steps of:
   drawing a plastic hollow preform through a mold passage formed in a closed mold by applying a generally constant suction to a downstream end of a conduit having an upstream end connected to an output end of the mold passage; and
   varying a flow cross section of the conduit between its upstream and downstream ends and thereby varying a rate at which the preform is drawn through the passage by the suction.

2. The molding method defined in claim 1 wherein the flow cross section is varied by displacing a valve element in the conduit between positions in which it differently blocks flow through the conduit.

3. The molding method defined in claim 2, further comprising the step of
   admitting outside air to the conduit downstream of the valve element when pressure in the conduit downstream of the element drops below a predetermined level.

4. The molding method defined in claim 1, further comprising the steps of:
   displacing the hollow preform toward the mold and into the passage at a predetermined rate;
   pinching off trailing and leading ends of the preform when same are respectively at the output end and an intake end of the passage;
   inflating the preform after pinching-off its ends and curing the preform.

5. The molding method defined in claim 4, further comprising the steps of:
   opening the mold after curing the preform;
   removing the cured preform from the open mold; and
   reclosing the mold.

6. A molding apparatus comprising:
   a closable mold forming when closed a nonstraight passage having an intake end and an output end;
   extruder means for forming a hollow plastic preform and feeding it to the intake end of the passage;
   a suction conduit having an upstream end connected to the output end of the passage and a downstream end;
   pump means connected to the downstream end of the conduit for applying a generally constant suction thereto;
   a valve element in the conduit intermediate its ends movable for varying a flow cross section of the conduit; and
   control means connected to the conduit and to the extruder means for moving the valve element, varying suction applied through the conduit to the passage in accordance with a position of the preform relative to the mold, and thereby varying a rate at which the preform is drawn through the passage by the suction.

7. The molding apparatus defined in claim 6 wherein the valve element is pivotal in the conduit.

8. The molding apparatus defined in claim 5, further comprising
   bypass means for introducing air into the conduit downstream of the element when pressure downstream of the element drops below a predetermined level.

9. The molding apparatus defined in claim 5 wherein the pump means has an output provided with a sound muffler.

* * * * *